United States Patent [19]
Pieper et al.

[11] Patent Number: 5,683,484
[45] Date of Patent: Nov. 4, 1997

[54] METHOD AND APPARATUS FOR SEPARATING OUT GALL DURING GLASS MELTING PROCESSES

[75] Inventors: Helmut Pieper; Lothar Rott; Matjaz Bucar, all of Lohr am Main, Germany

[73] Assignee: Beteiligungen Sorg GmbH & Co. KG, Lohr am Main, Germany

[21] Appl. No.: 574,389

[22] Filed: Dec. 18, 1995

[30] Foreign Application Priority Data

Dec. 25, 1994 [DE] Germany .................. 44 46 575.0

[51] Int. Cl.$^6$ .................................................. C03C 5/193
[52] U.S. Cl. .................. 65/134.5; 65/134.8; 65/327; 65/347; 588/254; 588/256; 588/900
[58] Field of Search .................. 65/128, 129, 134.5, 65/134.8, 327, 347; 588/256, 254, 900

[56] References Cited

U.S. PATENT DOCUMENTS

| | | | |
|---|---|---|---|
| 3,208,841 | 9/1965 | Burch | 65/179 |
| 3,294,512 | 12/1966 | Penberthy | 65/134.5 X |
| 3,362,808 | 1/1968 | Lyle | 65/335 |
| 3,375,095 | 3/1968 | Poole | 65/134.5 |
| 3,385,688 | 5/1968 | Plumat et al. | 65/335 |
| 3,482,956 | 12/1969 | Trethewey | 65/134.5 X |
| 3,573,019 | 3/1971 | Rees | 65/134.5 X |
| 3,592,151 | 7/1971 | Webber | 110/243 |
| 4,019,888 | 4/1977 | Verhappen et al. | 65/135 |
| 4,852,118 | 7/1989 | Pieper | 373/32 |
| 4,882,736 | 11/1989 | Piper | 373/32 |
| 4,944,785 | 7/1990 | Sorg et al. | 65/136 |
| 4,948,411 | 8/1990 | Pieper et al. | 65/342 |
| 5,032,161 | 7/1991 | Pieper et al. | 65/335 |
| 5,035,735 | 7/1991 | Pieper et al. | 65/134 |
| 5,120,342 | 6/1992 | Richards | 65/178 |
| 5,188,649 | 2/1993 | Macedo et al. | 65/21.3 |
| 5,340,372 | 8/1994 | Macedo et al. | 65/21.1 |
| 5,364,426 | 11/1994 | Richards | 65/474 |

FOREIGN PATENT DOCUMENTS

| | | |
|---|---|---|
| OS 14711842 | 8/1970 | Germany . |
| 3912311 | 8/1990 | Germany . |
| WO 93/02974 | 2/1993 | WIPO . |

OTHER PUBLICATIONS

Publication by Von G. Mayer–Schwinning, et al, entitled "Vitrification Process for the inertization of residual Products During Noxious Gas Removal in Termal Waste Disposal Units", VGB Kraftwerkstechnik 70 (1990) Issue 4, pp. 332–336.

Publication by L. Penberty–Fred scarfe entitled "Electric Boosting and Bubbling for Glass Furnaces" date unknown.

Publication by Pircus entitled "Melting Furnace Design in the Glass Industry" published by Books for Industry and the Glass Industry Magazine, dated 1980.

Dr–Ing Hans–Joachin Illig, ABC Glas, Deutscher Verlag für Grundstoffindustrie Leipzig, 1991—pp. 7, 98.

*Primary Examiner*—Donald E. Czaja
*Assistant Examiner*—Sean Vincent
*Attorney, Agent, or Firm*—Hill, Steadman & Simpson

[57] ABSTRACT

An electrically heated tank furnace is used to melt glass whereby a floating gall layer is formed on the melt, in particular during the vitrification of hazardous materials such as asbestos, fly ash, filter dust, whereby the tank of the furnace is fitted with a discharge outlet for the melt and an overflow channel with an inlet for the gall. A stream of ascending gas bubbles is produced in the melt. In order to promote better and automatic draining of the gall the stream of gas bubbles is produced directly in front of the overflow channel which thereby maintains a layer of liquid gall in the overflow channel and a layer of molten glass retained by a weir on the bottom of the overflow channel. The temperature in the overflow channel is chosen to be above the melting temperature of the gall, whilst the bottom layer of glass is maintained at a temperature at which the viscosity of the glass is so high that the glass does not drain out the overflow channel.

20 Claims, 1 Drawing Sheet

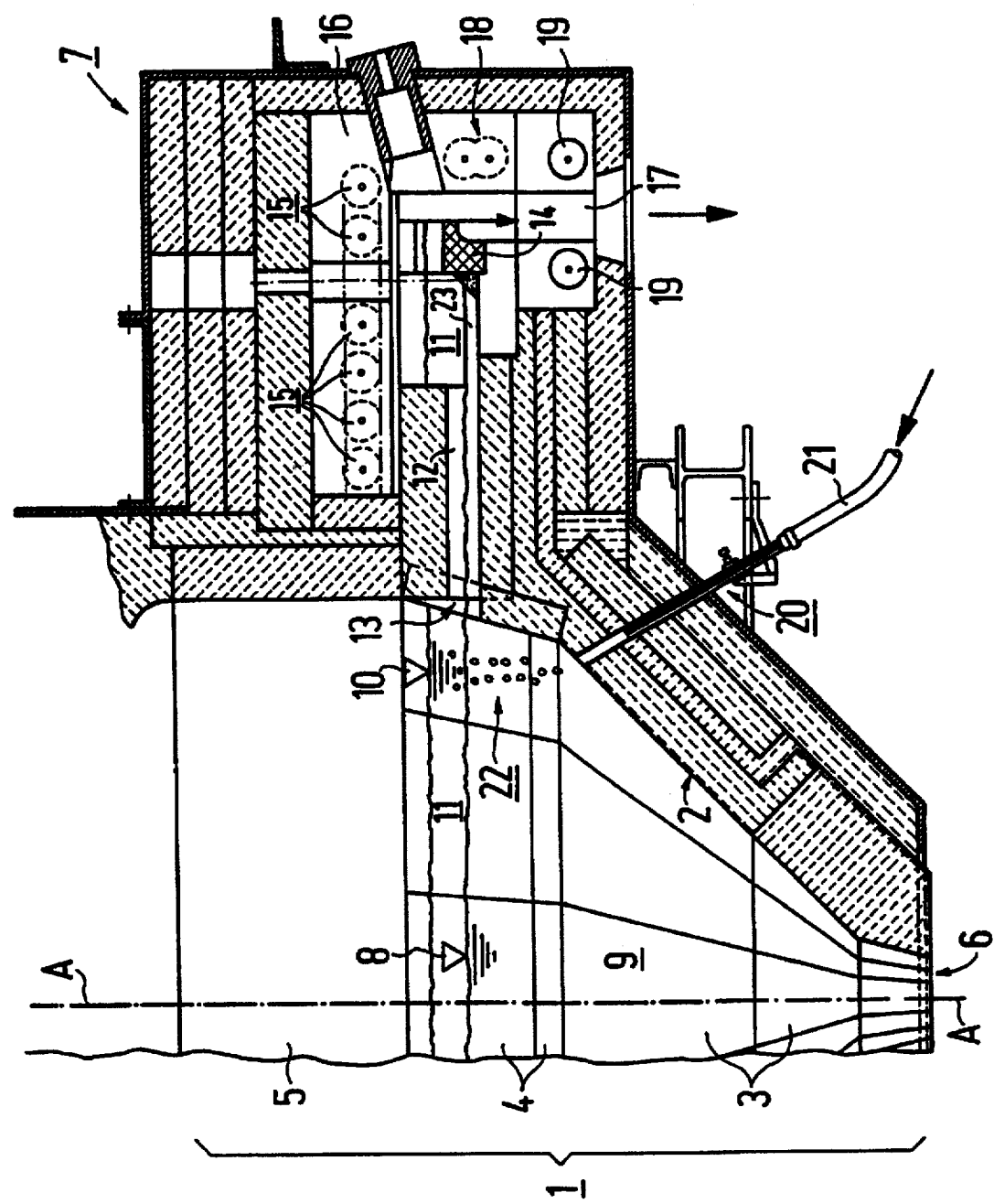

METHOD AND APPARATUS FOR SEPARATING OUT GALL DURING GLASS MELTING PROCESSES

BACKGROUND OF THE INVENTION

The invention concerns a method of melting of glass, whereby a gall layer which floats on the melt is formed, in an electrically heated tank furnace with a discharge outlet for the melt, in particular for the vitrification of hazardous materials such as asbestos, fly ash and filter dust, using an overflow channel connected to the furnace, with an inlet for the gall overflow, whereby an ascending stream of gas bubbles is produced in the melt, which leads to a collection of liquid gall.

During the production of certain types of glass, but in particular during the vitrification of hazardous materials of the types mentioned above, so-called gall is formed on and in the melt. According to the encyclopedia "ABC Glas", $2^{nd}$ edition 1991, gall consists of alkali sulphates, which occur when the melt is already saturated with these materials. However, it is also noted that sulphates and chlorides of alkaline or alkaline earth metals are also present in the gall. Part of the gall collects on the surface of the melt, but it is also present in the form of drops or droplets within the melt. The gall therefore consists of water soluble salts, which should be avoided in the production process, especially in the vitrification of hazardous materials.

Patent DE-PS 38 41 918 teaches the installation of a dividing wall in the flow path of a glass melt, in front of which wall the gall accumulates, and below which the melt can flow towards an extraction point. However, this accumulation of gall is only successful for the so-called surface gall and not for the gall droplets suspended in the melt. The surface gall is removed through a discharge opening, which is heated from all sides, and which is installed to the side in front of the dividing wall. In order to separate the surface gall from the charging material, the so-called batch, a further dividing wall is provided in front of the aforementioned dividing wall so that unmelted batch accumulates in front of the said second dividing wall. The use of the two dividing walls necessitates a corresponding length of that part of the furnace where separate drainage of the gall and the glass melt takes place.

With an all electrically heated furnace, where the surface temperature is normally below the temperature of the gall which forms, it is not possible to drain the gall in a controlled manner.

Patent application WO 93/02974 teaches the use of one or three streams of ascending oxygenated gas bubbles in the middle between plate electrodes, in order to achieve an increase in the electrical resistance of the glass melt and to burn flammable components of the charging material. In this way gall droplets suspended in the melt are transported more quickly to the gall layer floating on the melt. Overflow channels installed at the side are fitted with so-called freeze valves in order to be able to control the drainage of the gall independently of the temperature. However the freezing and thawing of the gall proceeds very slowly as a result of the poor heat conductivity of the gall and therefore the intervals between successive drainings of the gall are correspondingly long. Even with thermostatic control of the freeze valves it is not possible to achieve automatic gall drainage. As a result of their central location, the ascending gas bubbles push the gall and charging material apart, so that part of the gall is kept away from the overflow channel.

SUMMARY OF THE INVENTION

The aim of the invention is therefore to describe a method of the type described initially in which a larger proportion of the gall accumulates on the surface and in which controlled drainage of the gall is possible.

The object of the invention is achieved by the method described initially in that the ascending stream of gas bubbles is produced directly in front of the overflow channel and a layer of liquid gall and a bottom layer of molten glass held back by a weir are maintained in the overflow channel, whereby the temperature in the overflow channel is higher than the melting temperature of the gall, while the bottom layer of glass is kept at a temperature at which the viscosity of the glass is so high that the glass does not flow out of the overflow channel.

As a result of the flow path of the gas bubbles according to the invention, a defined upwards movement of the melt is produced, as a result of which not only are suspended gall droplets transported to the surface and into the gall layer on the surface, but hot glass is also constantly brought to the surface area of the melt directly in front of the overflow channel for the gall. The gall therefore tends to collect at this location and when a certain layer depth is exceeded it drains automatically through the overflow channel. The measures according to the invention result in reliable and reproducible control of the gall problem without the necessity for excessive expenditure.

As a layer of molten glass is present beneath the gall layer, including in the overflow channel, the overflow channel is protected as far as possible against the aggressive effect of the gall. The presence of the weir at the end of the overflow channel means that not only liquid glass but also liquid gall is maintained in the overflow channel, and that the liquid gall can flow over the weir without a long thawing process.

Even during discontinuous operation, drainage of the gall can be controlled extremely quickly by direct radiation heating, whereby the control is continuous as the viscosity of the gall is influenced by the temperature, so that the rate of draining can be reduced, if required, without the necessity to freeze the gall and then, with difficulty, thaw it again.

In a particularly advantageous embodiment of the invention, radiation heat is applied from above to at least a part of the flow path of the gall in the overflow channel.

A temperature difference of several hundred degrees Celsius is necessary, so that if the temperatures are controlled precisely, it is possible to achieve automatic drainage of the gall, whereby the gall can be drained discontinuously, preferably periodically.

The invention also relates to apparatus for the execution of the method with an electrically heated furnace with an outlet for molten glass and with a heatable overflow channel connected to the side of the furnace, whereby the overflow channel has an inlet for the gall and whereby at least one inlet device is provided in the furnace for bubble-forming gases.

In order to achieve the object according to the invention, the apparatus is characterized by the fact that this gas inlet device is installed directly below the overflow channel for the gall and that a weir for the overflow of the gall and for retaining the glass is installed at the end of the horizontal overflow channel, and that radiation heating equipment is installed above the overflow channel, in order to heat the overflow channel for the gall from above.

In a further embodiment of the invention, it is particularly advantageous if the first pad of the overflow channel is completely enclosed whereas the other end is open at the top below the radiation heating equipment, and if radiation heating equipment for heating the surface of the gall is installed above the overflow channel, at least in the area which is open at the top.

Particularly accurate temperature control of the gall layer is achieved in this way.

BRIEF DESCRIPTION OF THE DRAWINGS

An example of the subject of the invention is described in detail below with the aid of the only FIGURE, which shows a vertical section through a furnace and the attached device used for draining the gall.

DETAILED DESCRIPTION OF THE PREFERRED EMBODIMENTS

As shown in FIG. 1, the furnace 1 has an internal surface 2 which at least in the lower part of the furnace, consists of truncated pyramid surfaces 3 and 4 which abut one another. These truncated pyramid surfaces have a common axis A—A together with an adjoining prism surface installed above. A discharge outlet 6 for the molten glass or for the vitrified waste materials and/or for the accumulated molten metals is centered on this axis. For the sake of simplicity, the energy sources required for the furnace 1, which supply energy and compensate for the energy losses, are not shown in the FIGURE as such energy sources are known. Bottom electrodes, top electrodes or fossil fuel burners can be used as energy sources. It is also possible to use a combination of electrode and burners.

As a result of the design and method of operation, the furnace 1 has two liquid levels determined by the detailed design, these being a first liquid level 8 for the melt 9 and a second liquid level 10 for a gall layer 11 which floats on the melt 9.

A drainage device 7 for the gall 11 is attached to the side of the furnace 1, whereby the drainage outlet has an horizontal overflow channel 12 in which there is an inlet 13 for the gall and a weir 14 for the overflow of the gall. The first pad of the overflow channel 12 is completely enclosed, whereas the other end is open at the top. Radiation heating equipment 15 is installed above the overflow channel 12 in the area which is open at the top, whereby the radiation heating equipment consists of numerous rod-shaped radiation heating elements installed horizontally and parallel to one another, and which run perpendicular to the plane of the drawing and at right angles to the flow direction of the gall in the overflow channel 12.

In this way the surface of the gall layer in the final stretch of the overflow channel 12 is heated and maintained at a temperature which permits reliable flow of the gall across the weir 14.

As can be seen in the FIGURE, the first two radiation heating elements (viewed in the flow direction of the gall) lie above the first part of the overflow channel 12 which is completely enclosed, so that the top of the channel can be maintained at a temperature at which the gall does not freeze.

It can also be seen in the FIGURE that the radiation heating equipment 15 is installed in a heating chamber 16, which extends not only over that part of the overflow channel 12 which is open at the top, but also over that part of the overflow channel 12 which is closed at the top. The weir 14 is also located within the area of influence of the radiation heating equipment 15, as can be seen easily in the FIGURE.

A perpendicular drainage shaft 17 for the gall adjoins the weir 14, and this drainage shaft is surrounded by further heating equipment 18 and 19, installed in heating chambers of the appropriate design.

An essential element of the invention is located in the furnace 1 below the overflow channel 12 or below its inlet 13, this element being an inlet device 20 which consists of one (as shown) or more gas nozzles, which are called "bubblers". A pipe 21 is used for the supply of gas to the inlet device 20, and this gas produces a stream of ascending gas bubbles 22 in the glass melt 9 and the gall layer 11 in front of the inlet 13, and these gas bubbles produce a forced upwards movement in the melt, which results in the transport of hotter melt from the bottom of the furnace 1 to the surface and into the gall layer 11. Any drops or droplets of gall which exist in the glass melt are transported to the top with the melt and can then combine with the gall layer, which collects in particular in the area of the inlet 13. When the level determined by the weir 14 is exceeded, the gall enters the drainage shaft 17 and is collected for further disposal in a container which is not shown. As a result of the fact that the bottom layer 23 of molten glass in the overflow channel 12 is kept at a temperature which prevents it from flowing out of the overflow channel 12, whereas the heating equipment already mentioned heats the gall 11 to such a temperature that the gall is kept in a state in which it can flow easily, it is possible to control the drainage of the gall. It is therefore possible to adjust the heating capacity at intervals so that the gall is drained intermittently.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A process for melting glass to form a glass melt, in particular for the vitrification of hazardous materials in which gall forms a gall layer which floats on said glass melt, in an electrically heated tank melting furnace having a discharge outlet for said glass melt and an overflow channel connected to said furnace, said overflow channel having an inlet for overflow of said gall layer, comprising the steps of:
   producing a stream of ascending gas bubbles in said melt, directly in front of said overflow channel, to result in an accumulation of liquid gall at said gall layer directly in front of said inlet of said overflow channel,
   retaining said layer of liquid gall and a bottom layer of molten glass in said overflow channel by means of a weir,
   maintaining a temperature in said overflow channel higher than a melting temperature of said gall, and
   maintaining said bottom layer of glass at a temperature at which a viscosity of said bottom layer of glass is so high that said glass cannot flow out of said overflow channel.

2. A process according to claim 1, further comprising the step of exposing said overflow channel to radiant heating from above for at least part of its flow path.

3. A process according to claim 1, further comprising the step of changing a heating capacity periodically so that said gall drains over said weir intermittently.

4. An apparatus for melting glass to form a glass melt, in particular for the vitrification of hazardous materials in which gall forms a gall layer which floats on said glass melt, comprising:

an electrically heated furnace having wall means for retaining molten glass with a discharge outlet for molten glass extending through said wall means, a heatable overflow channel installed on a side of said furnace having an inlet for said gall extending through said wall means, at least one inlet means extending through said wall means and being positioned directly below said inlet of said overflow channel for producing a stream of ascending gas bubbles in front of said inlet of said overflow channel, a weir for drainage of said gall and retention of said glass installed at an end of said overflow channel opposite said inlet, and radiation heating equipment for heating said overflow channel positioned above said overflow channel.

5. An apparatus according to claim 4, wherein a first part of said overflow channel, adjacent said inlet, is completely enclosed and a second part is open at a top thereof, below said radiation heating equipment.

6. An apparatus according to claim 5, wherein said radiation heating equipment is also positioned above said enclosed first part of said overflow channel.

7. An apparatus according to claim 5, wherein said radiation heating equipment is positioned in a heating chamber which extends over said enclosed part of said overflow channel and over said open part of the overflow channel and over said weir.

8. An apparatus according to claim 4, wherein a vertical drainage shaft for said gall is positioned adjacent to said weir opposite said overflow channel.

9. An apparatus according to claim 8, wherein said vertical drainage shaft is provided with further radiation heating equipment.

10. An apparatus according to claim 4, wherein an inner surface of said wall means is constructed of truncated, inverted cones or pyramids and a cylinder, which have a common vertical axis, and said inlet means for said bubble-forming gas is installed in a sloping part of said inner surface.

11. An apparatus for melting glass to form a glass melt, in which gall forms a gall layer which floats on said glass melt, comprising:

a heated furnace having wall means for retaining molten glass and a discharge outlet for molten glass extending through said wall means, a heatable overflow channel having an inlet for said gall extending through said wall means, at least one inlet means for introducing a gas into an interior of said furnace to form bubbles in said glass melt, said inlet means being positioned to cause said bubbles to reach a surface of said glass melt adjacent to said inlet for said overflow channel, a weir positioned at an end of said overflow channel opposite said inlet for retaining said glass melt and permitting an overflow of said gall, and a heating apparatus for heating at least a portion of said overflow channel.

12. An apparatus according to claim 11, wherein a first part of said overflow channel, adjacent said inlet, is completely enclosed, a second part, spaced away from said inlet, is open at a top thereof, and said heating apparatus is positioned above said second part of said overflow channel.

13. An apparatus according to claim 12, wherein said heating apparatus is also positioned above said enclosed first part of said overflow channel.

14. An apparatus according to claim 12, wherein said heating apparatus is positioned in a heating chamber which extends over said enclosed part of said overflow channel and over said open part of the overflow channel and over said weir.

15. An apparatus according to claim 11, wherein said heating apparatus comprises a plurality of radiant heating elements.

16. An apparatus according to claim 11, wherein a vertical drainage shaft for said gall is positioned adjacent to said weir opposite said overflow channel.

17. An apparatus according to claim 16, wherein said vertical drainage shaft is provided with further heating apparatus.

18. An apparatus according to claim 11, wherein an inner surface of said wall means is constructed of truncated, inverted cones or pyramids and a cylinder, which have a common vertical axis, and said inlet means for said bubble-forming gas is installed in a sloping part of said inner surface.

19. An apparatus according to claim 11, wherein said inlet means for introducing a gas extends through said wall means.

20. An apparatus according to claim 11, wherein said inlet means for introducing a gas is positioned directly below said inlet for said overflow channel.

* * * * *